United States Patent
Hollis

(10) Patent No.: US 9,337,893 B2
(45) Date of Patent: May 10, 2016

(54) CROSSTALK ANALYSIS METHODS USING SUPERPOSITION

(71) Applicant: QUALCOMM Incorporated, San Diego, CA (US)

(72) Inventor: Timothy Mowry Hollis, Poway, CA (US)

(73) Assignee: QUALCOMM Incorporated, San Diego, CA (US)

(*) Notice: Subject to any disclaimer, the term of this patent is extended or adjusted under 35 U.S.C. 154(b) by 140 days.

(21) Appl. No.: 14/101,968

(22) Filed: Dec. 10, 2013

(65) Prior Publication Data

US 2015/0162952 A1    Jun. 11, 2015

(51) Int. Cl.
H04B 3/32 (2006.01)
H04M 1/02 (2006.01)
H04B 3/487 (2015.01)

(52) U.S. Cl.
CPC ............ *H04B 3/32* (2013.01); *H04B 3/487* (2015.01); *H04M 1/0202* (2013.01)

(58) Field of Classification Search
None
See application file for complete search history.

(56) References Cited

U.S. PATENT DOCUMENTS

| | | |
|---|---|---|
| 6,278,951 B1 | 8/2001 | Sato |
| 7,505,512 B1 | 3/2009 | Anderson et al. |
| 7,761,826 B1 * | 7/2010 | Thanvantri et al. ........... 716/108 |
| 2003/0217342 A1 | 11/2003 | Chiu et al. |
| 2004/0170230 A1 * | 9/2004 | Zimmerman et al. ........ 375/285 |
| 2013/0031151 A1 | 1/2013 | Hollis |
| 2014/0072023 A1 * | 3/2014 | Mellitz et al. ................ 375/227 |

FOREIGN PATENT DOCUMENTS

WO    WO-2013138180 A1    9/2013

OTHER PUBLICATIONS

Bae S.J., et al., "A 40nm 2Gb 7Gb/s/pin GDDR5 SDRAM with a programmable DQ ordering crosstalk equalizer and adjustable clock-tracking BW," IEEE International Solid-State Circuits Conference Digest of Technical Papers (ISSCC), 2011, pp. 498-500.
Balamurugan G., et al., "Modeling and Analysis of High-Speed I/O Links," IEEE Transactions on Advanced Packaging, May 2009, vol. 32 (2), pp. 237-247.
International Search Report and Written Opinion—PCT/US2014/069398—ISA/EPO—Apr. 7, 2015.

* cited by examiner

*Primary Examiner* — Gary Mui
(74) *Attorney, Agent, or Firm* — Loza & Loza, LLP

(57) ABSTRACT

System, methods and apparatus are described that facilitate communications circuit design. A first response of a channel to a first signal transmitted through the channel and a second response of the channel to a second signal transmitted through a neighboring channel are determined and a first signal analysis based on the first response and the second response is calculated. A modified second response is determined after modifying the magnitude or timing of the second response to simulate a change in a characteristic of the second signal. A second signal analysis performed using the first response and the modified second response may identify differences in the effects of the second signal and the modified second signal on the first signal. A physical relationship between a pair of connectors of a circuit may be modified based on the magnitude of a scaling factor or phase difference used to obtain the second response.

40 Claims, 12 Drawing Sheets

CROSSTALK ANALYSIS METHODS USING SUPERPOSITION

BACKGROUND

1. Field

The present disclosure relates generally to high-speed data communications interfaces, and more particularly, to optimizing circuit designs for communications links.

2. Background

Manufacturers of mobile devices, such as cellular phones, may deploy various electronic components in one or more integrated circuit (IC) devices and/or on one or more circuit boards. The electronic components may include processing devices, storage devices, communications transceivers, display drivers, and the like. In one example, a processing device may be provided on a printed circuit board (PCB) and may communicate with one or more memory devices on the same PCB and/or on a different PCB. The processor may communicate with the memory devices using a high-speed communication link that supports unidirectional and bidirectional channels for data and control signals.

In a multi-wire interface, the maximum speed of the communication link and the ability of a receiver to reliably capture data may be limited by crosstalk from neighboring connectors. The effect of crosstalk can be diminished by increasing spacing between adjacent connectors, assignment of signals transmitted on adjacent connectors, reducing transmission clock rates and through other techniques, many of which can have negative impacts including reduced performance of the communication link, increased size of semiconductor dice, circuit boards and chip carriers. Accordingly, there is a need for tools and techniques that optimize design of communications links.

SUMMARY

Embodiments disclosed herein provide systems, methods and apparatus that can be used to optimize communications links.

In an aspect of the disclosure, a method for optimizing a circuit and/or a circuit design process includes determining a first response of a channel to a first signal transmitted through the channel, determining a second response of the channel to a second signal transmitted through a neighboring channel, performing a first signal analysis based on the first response and the second response, determining a modified second response by modifying a magnitude or timing of the second response to simulate a change in a characteristic of the second signal, and performing a second signal analysis based on the first response and the modified second response. The first signal analysis may identify the effect of the second signal on the first signal. The second signal analysis identifying the effect of the modified second signal on the first signal. A signal analysis may include a statistical analysis and/or a best-case/worst-case analysis.

In an aspect of the disclosure, the first signal may comprise a pulse and the second signal comprises a pulse. The first response may be determined by sampling a version of the first signal received from the channel. The second response may be determined by sampling crosstalk in the channel. The channel may be electromagnetically or electrostatically coupled to the neighboring channel.

In an aspect of the disclosure, the first signal analysis may be performed by recursively convolving samples of the first response with samples of the second response. The second signal analysis may be performed by recursively convolving samples of the first response with samples of the second response after a delay is added to the first response or the second response. A physical relationship between a pair of connectors of a circuit may be modified based on the delay.

In an aspect of the disclosure, the modified second response includes scaling samples of crosstalk in the channel. The second signal analysis may be performed by recursively convolving samples of the first signal received from the channel with scaled samples of the crosstalk in the channel. A physical relationship between a pair of connectors of a circuit may be modified based on a magnitude of a scaling factor used to obtain the scaled samples. A distance separating a pair of connectors of a circuit may be modified based on a magnitude of a scaling factor used to obtain the scaled samples.

In an aspect of the disclosure, the steps of determining the modified second response and performing the second signal analysis may be iteratively repeated until the effect of the modified second signal on the first signal crosses a desired threshold. An attribute of a pair of connectors is modified between each iteration.

In an aspect of the disclosure, an apparatus includes means for determining a first response of a channel to a first signal transmitted through the channel, means for determining a second response of the channel to a second signal transmitted through a neighboring channel, means for performing a first signal analysis based on the first response and the second response, means for determining a modified second response by modifying the magnitude or timing of the second response to simulate a change in a characteristic of the second signal, and means for performing a second signal analysis based on the first response and the modified second response. The first signal analysis may identify the effect of the second signal on the first signal. The second signal analysis may identify the effect of the modified second signal on the first signal.

In an aspect of the disclosure, an apparatus for wireless communication includes a processing system configured to determine a first response of a channel to a first signal transmitted through the channel, determine a second response of the channel to a second signal transmitted through a neighboring channel, perform a first signal analysis based on the first response and the second response, determine a modified second response by modifying the magnitude or timing of the second response to simulate a change in a characteristic of the second signal, and perform a second signal analysis based on the first response and the modified second response. The first signal analysis may identify the effect of the second signal on the first signal. The second signal analysis identifying the effect of the modified second signal on the first signal.

In an aspect of the disclosure, a processor-readable storage medium, which may be non-transitory, has or maintains one or more instructions which, when executed by at least one processing circuit, cause the at least one processing circuit to determine a first response of a channel to a first signal transmitted through the channel, determine a second response of the channel to a second signal transmitted through a neighboring channel, perform a first signal analysis based on the first response and the second response, determine a modified second response by modifying the magnitude or timing of the second response to simulate a change in a characteristic of the second signal, and the first signal analysis identifying the effect of the second signal on the first signal, perform a second signal analysis based on the first response and the modified second response. The first signal analysis may identify the effect of the second signal on the first signal. The second signal analysis may identify the effect of the modified second signal on the first signal.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as, but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Figure 1:
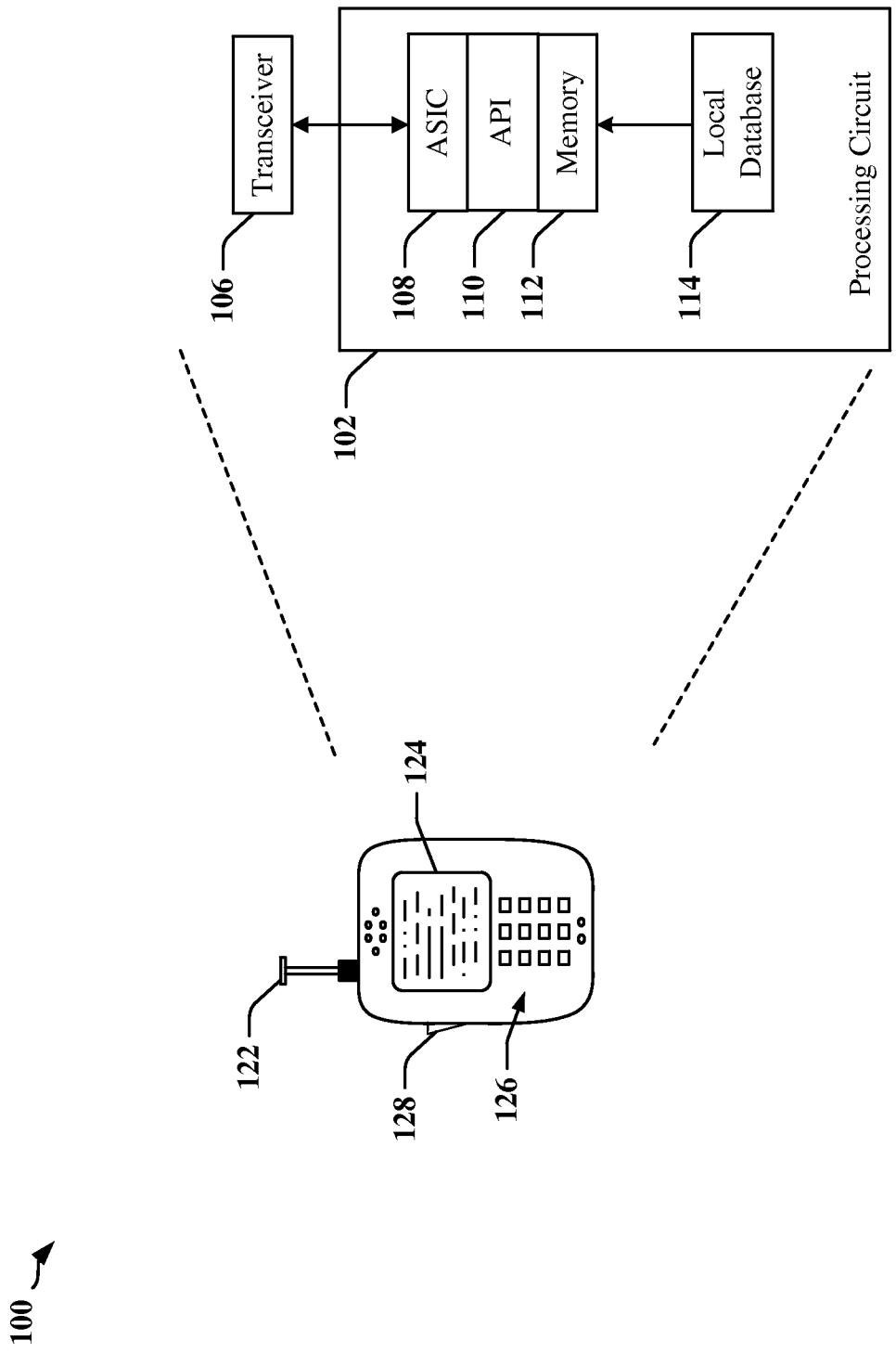
FIG. 1 depicts an apparatus employing a high-speed data link between circuits.

Certain aspects of the invention may be applicable to communications links deployed between electronic devices that may include subcomponents of an apparatus such as a telephone, a mobile computing device, an appliance, automobile electronics, avionics systems, etc. FIG. 1 depicts an apparatus 100 that may employ a communication link between IC devices. In one example, the apparatus 100 may comprise a wireless communication device that communicates through a radio frequency (RF) transceiver with a radio access network (RAN), a core access network, the Internet and/or another network. The apparatus 100 may include a communications transceiver 106 operably coupled to a processing circuit 102. The processing circuit 102 may comprise one or more IC devices, such as an application-specific IC (ASIC) 108. The ASIC 108 may include one or more processing devices, logic circuits, and so on. The processing circuit 102 may include and/or be coupled to processor-readable storage such as a memory device 112 that may maintain instructions and data that may be executed by the processing circuit 102. The processing circuit 102 may be controlled by one or more of an operating system and an application programming interface (API) 110 layer that supports and enables execution of software modules residing in storage media, such as the memory device 112 of the wireless device. The memory device 112 may include read-only memory (ROM) or random-access memory (RAM), electrically erasable programmable ROM (EEPROM), flash cards, or any memory device that can be used in processing systems and computing platforms. The processing circuit 102 may include, or have access to a local database 114 that can maintain operational parameters and other information used to configure and operate the apparatus 100. The local database 114 may be implemented using one or more of a database module, flash memory, magnetic media, EEPROM, optical media, tape, soft or hard disk, or the like. The processing circuit may also be operably coupled to external devices such as an antenna 122, a display 124, operator controls, such as a button 128 and a keypad 126 among other components.

Figure 2:
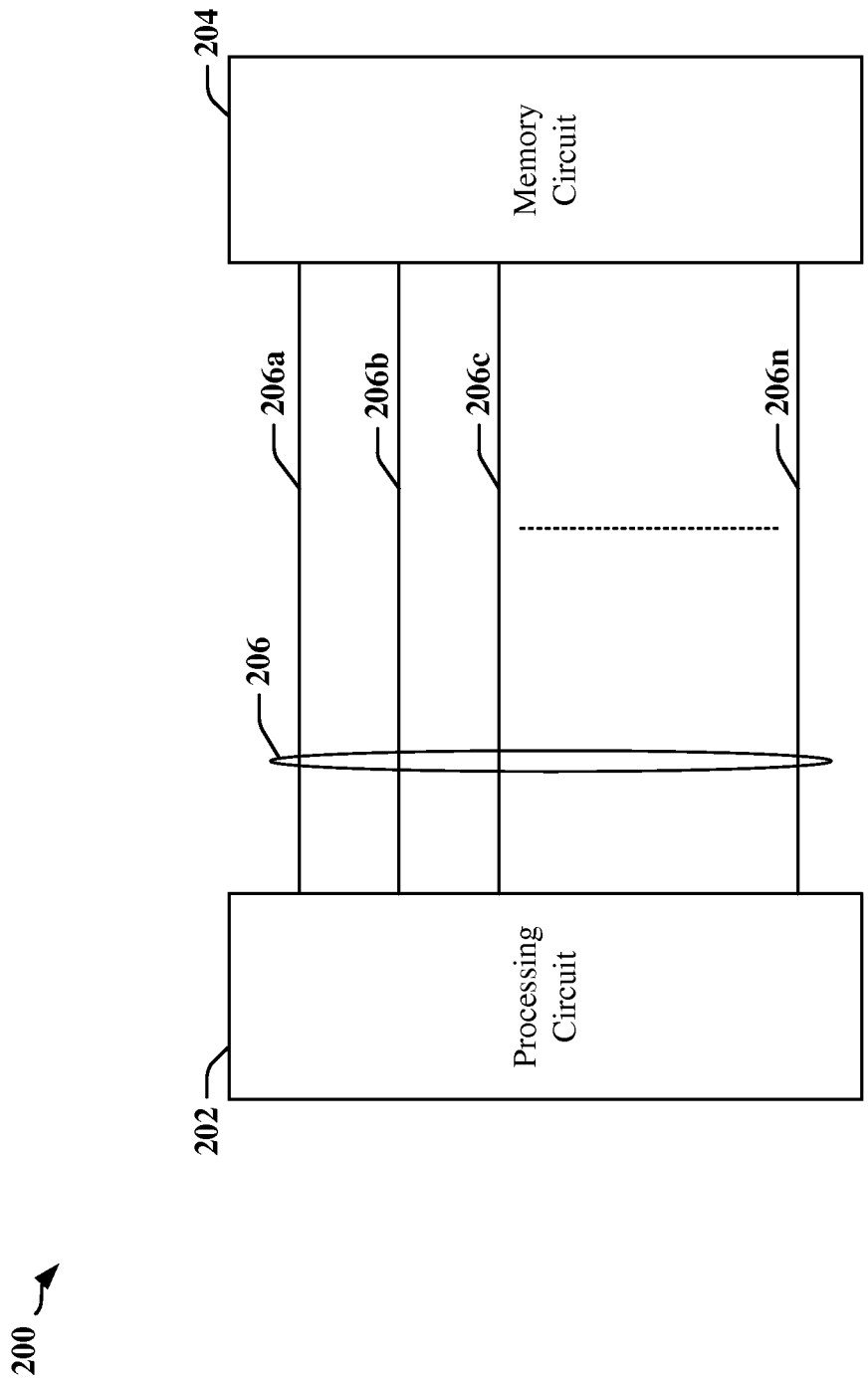
FIG. 2 is a diagram illustrating an apparatus in which IC devices communicate using a single-ended communication link.

FIG. 2 is a diagram illustrating an apparatus 200 in which a pair of devices or circuits 202, 204 communicate using a communication link 206. The pair of devices or circuits 202, 204 may be components of the apparatus 100 depicted in FIG. 1, for example. The communication link 206 may include a number n connectors 206a-206n constructed from wires, electrically conductive traces on a circuit board or chip carrier, package substrate, silicon (or alternative material) interposer, electrically conductive traces in a metallization layer of an IC, and/or other electrical connectors and devices. The communication link 206 may include unidirectional and/or bidirectional connectors 206a-206n. The communication link 206 may include single-ended connections, whereby each signal is transmitted on one connector 206a-206n. The communication link 206 may include one or more differential pairs of connectors which communicate data in two complementary signals sent on a pair of the connectors 206a-206n.

In the example, data is transmitted by a processing circuit 202 to a memory circuit 204 that captures and decodes the data from certain of the various connectors. Some memory devices, such as dual data rate (DDR) dynamic random access memory (DRAM) use a data strobe (DQS) transmitted on one of the connectors 206a-206n to determine when the data is valid and/or can be reliably captured from the communication link 206. DDR and other interfaces may rely on the propagation of a complimentary data strobe (DQST/C) along with the various data signals (DQs) to trigger data capture within the receiver. Conventionally, DDR interfaces have been "source-synchronous" with matched DQ and DQST/C path delays, which can facilitate noise and/or jitter cancellation techniques applied during data capture.

Figure 3:
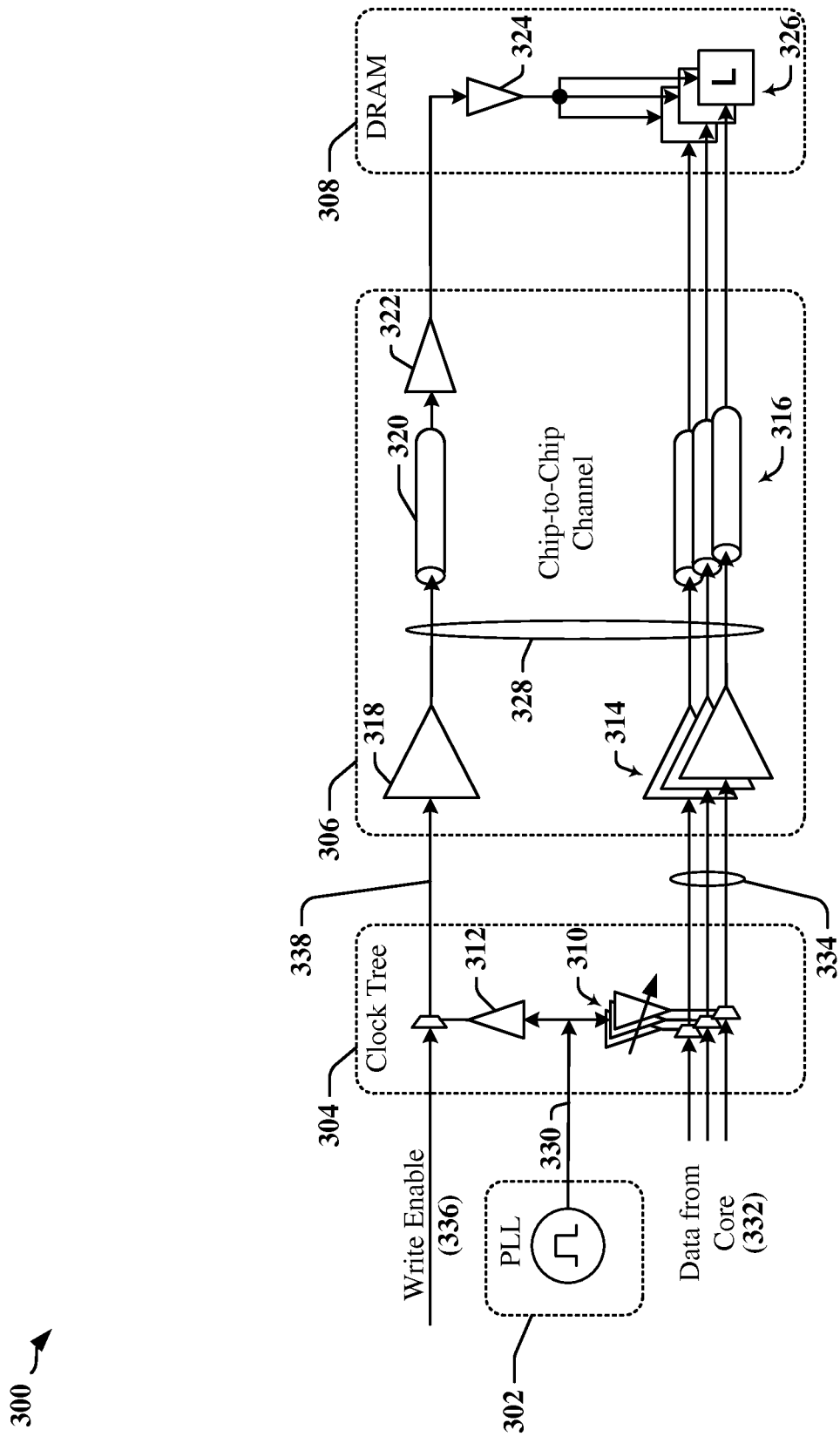
FIG. 3 illustrates certain aspects of circuitry associated with a communication link coupling the IC devices.

FIG. 3 is a diagram 300 illustrating certain aspects of circuitry associated with a communication link coupling components of a pair of IC devices. In one example, the circuitry may include a clock tree circuit 304 that distributes a clock 330 to logic that provides, gates and/or selects data 332 and control signals such as a write enable signal 336 for transmission through a communication link 328, line drivers 314, 318 and receivers 322 associated with a channel 306 provided between IC devices and logic 326 and drivers 324 that support the operation of one or more DRAM devices 308. The diagram 300 is not intended to represent physical locations of the circuitry. In one example, some or all of the control signals 338 and/or the data signals 334 may be provided to line drivers 314, 318 for transmission over single-ended signal wires or connectors 316, 320 of the communication link 328. In another example, some or all of the control signals 338 and/or the data signals 334 may be provided to line drivers 314, 318 for transmission over differential pairs of signal wires or connectors 316, 320 of the communication link 328.

As noted, certain DDR interfaces can rely on source-synchronous propagation of control signals 338 (or DQST/C) with the data signals 334. In the example shown in FIG. 3, the control signals 338 and/or data signals 334 may be transmitted with asymmetric delays. Low-power 4th generation DDR (LPDDR4) devices may be associated with non-uniform static delays such that DQ-DQS launch timing may vary by a large degree. In the LPDDR4 example, timing delays of between 200 picoseconds (200 ps) and 800 ps may be observed or expected between DQ and DQS edges. The differences in timing may complicate noise and/or jitter cancellation during data capture.

Circuit designers can benefit from models that can characterize the response of channels to transmitted signals and interference such as co-channel interference, which may include or be referred to as crosstalk. The response of the connectors 316, 320 to a pulse may be used to model the signaling channels provided by the connectors 316, 320 and the ability of the signaling channels to handle signals transmitted between IC devices. A channel response may be characterized using an eye diagram contour or a statistical data eye diagram based on the pulse response of a signaling channel provided by the connectors 316, 320. The eye diagram contour often represents the worst-case eye opening, while the statistical eye diagram presents the eye opening as a function of probabilities. In one example, a statistical data eye diagram may be created using techniques and methods described in a document published by the Institute of Electrical and Electronic Engineers (IEEE), which was authored by Casper et al. and titled: "An accurate and Efficient Analysis Method for Multi-Gb/s Chip-to-chip Signaling Schemes" (See Proceedings of IEEE Symposium on VLSI Circuits, pp. 54-55, June 2002, which is incorporated herein by reference in its entirety).

As disclosed herein, statistical data eye diagrams and associated methods and techniques may be used to simulate the effects of co-channel interference on input signals and thereby reduce design cycles and improve design efficiency by enabling optimization of interconnect circuits in simulators, for example. Crosstalk from a neighboring (aggressor) communications channel/connector typically derives from a different data stream than a data stream of interest (victim), and is generally non-coherent. In later generations of synchronous DRAM (SDRAM) devices, including LPDDR4 that employ a static delay asymmetry, the effectiveness of noise/jitter cancellation techniques may be reduced and phase differences between signals can become more significant.

According to certain aspects disclosed herein, methods for generating statistical data eye diagrams may be adapted to enable and support crosstalk analysis and amelioration during circuit design. In one example, processes and techniques disclosed herein may be used during the design phase to establish design targets and to postulate and evaluate "what-if" scenarios. Certain of the methodologies may enable exploration of relationships between aggressor signals and victim signals through numerical manipulation. For example, the crosstalk response of a channel to an aggressor pulse or signal may be assumed to be independent of a victim pulse or other victim signal applied to, or communicated through the channel. The use of numerical manipulation can enable iterative crosstalk optimization without iterative redesign of the connector architecture.

Numerical manipulation may include scaling the magnitude of crosstalk induced or otherwise introduced into a channel in order to determine tolerable levels of crosstalk from the perspective of a victim signal. A scaling factor derived from the numerical manipulation may be translated into one or more parameters that control routing and other characteristics of connectors associated with a circuit board, chip carrier, IC device and/or a package. For example, the scaling factor may be used to adapt or derive parameters that control trace spacing, shielding requirements, etc.

Numerical manipulation may include modifying the phase relationship between a victim signal and crosstalk induced or introduced by an aggressor signal into a channel in order to identify worst-case timing and/or best-case timing, and to explore the sensitivities of a particular design.

According to certain aspects described herein, a methodology for quantifying or estimating crosstalk and for exploring its effect on a victim signal may include using processes based on an adapted and/or expanded Casper method or methods. The Casper method or methods may be generally useful for channel evaluation, and the method may be adapted as described herein for use during a circuit design phase to establish design targets and evaluate "what-if" scenarios associated with placement and routing of connectors of a bus.

In some instances, a statistical eye diagram may be used to characterize a channel pulse response. The channel pulse response may be generated by convolving the impulse response of the channel with a pulse representative of a signal transmitted over the channel. The pulse may represent a digital signal that transitions from logic '0' to logic '1' and back to logic '0' after a transmission period. In some instances, the pulse response may be generated through the appropriate combination of step responses. A positive-going step response, followed by a negative-going step response delayed by the data bit period, or unit interval (UI), may be used to form a positive pulse response with a pulse width corresponding to the data bit period/UI. In linear-time-invariant systems, these pulse responses may be combined to form the pulse response for later convolution with the channel response, or the step responses may each be convolved with the channel response and then combined to form the channel pulse response. In other words, the order of these initial operations does not necessarily matter. A process for generating the statistical eye may include transmitting a pulse over a physical channel and sampling a signal received from the channel at a receiver in a plurality of sampling instants, or unit intervals (UIs). The samples obtained at the receiver may be used to determine the pulse response of the channel and to model the channel for further analysis.

In one example, the samples of the received signal may represent corresponding UIs and inter-symbol interference (ISI) terms. Each ISI sample may be recursively convolved with one another to obtain an ISI probability distribution function (PDF). A PDF of a random variable represents the probability that the random variable lies within an infinitely small interval of a function representing the sample space of the random variable. The generated PDF may be convolved with a sampled high voltage (representing a logic '1,' for example) and a sampled low voltage (representing a logic '0,' for example) to produce a pair of PDFs that are representative of probability distribution of the logic '1' and logic '0,' respectively. Crosstalk may be characterized using the same method.

Figure 4:
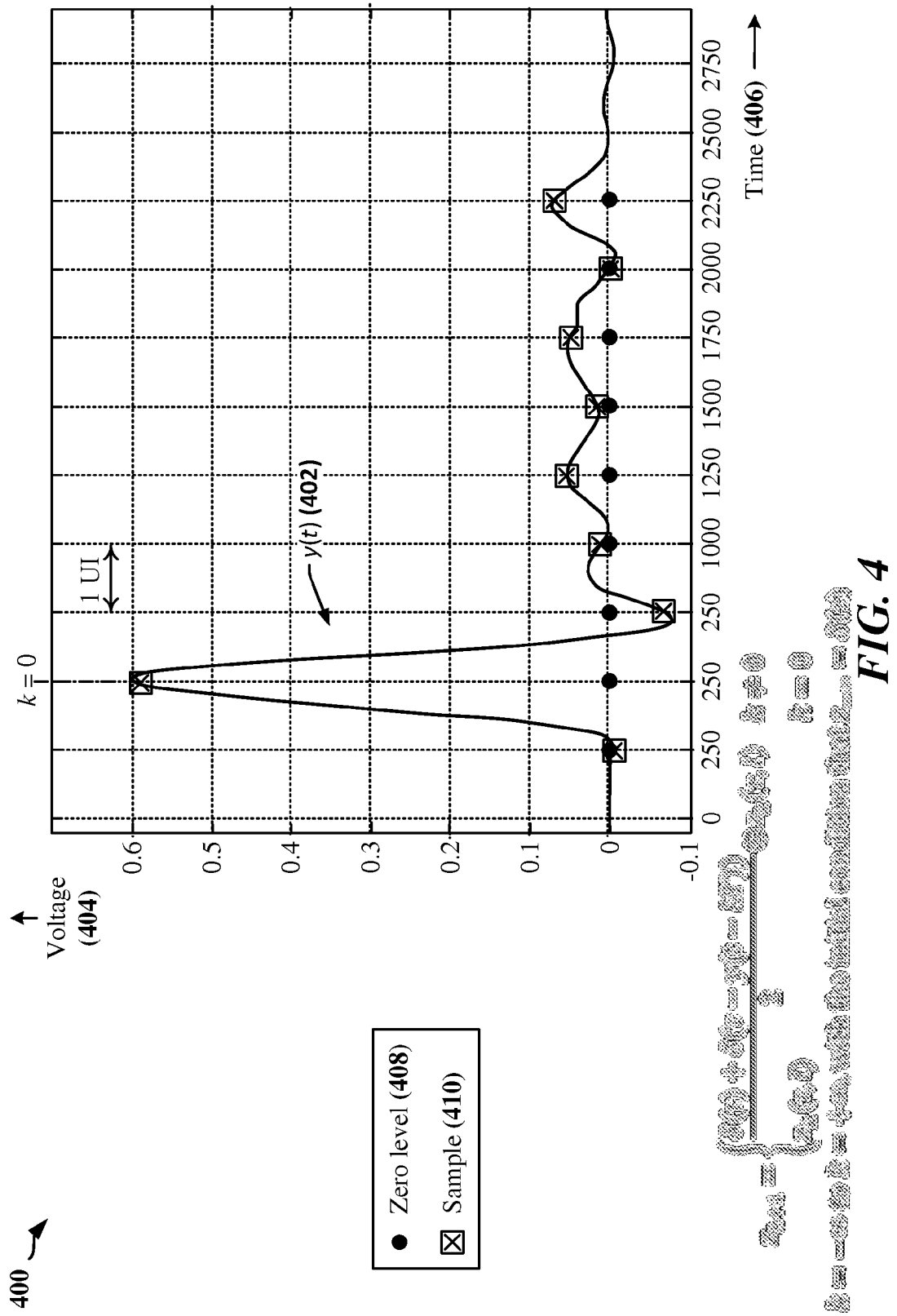
FIG. 4 illustrates sampling at a receiver of a pulse transmitted over a communication link.

FIG. 4 is a graph 400 illustrating the sampling of a signal 402 representative of a pulse received from a channel. The graph 400 shows a simulated pulse response illustrating one set of logic '0' and logic '1' samples that may be used to produce an eye diagram contour or a statistical eye diagram. In an aspect, 1 UI sample terms may be summed together to determine a worst-case voltage deviation. For example, all positive 1 UI samples may be combined through summation to represent a max deviation from a logic '0,' while all negative 1 UI samples may be combined through summation and subtracted from the sample taken from the pulse peak to represent a max deviation from a logic '1.' In both cases, the polarities of the summed samples are such that they combine to close the eye diagram contour in the vertical direction. In an aspect, 1 UI sample terms may be recursively convolved assuming that there is equal probability of a transmitted logic '0' or logic '1.' In the example, a series of samples may have the values {−0.01, 0.059, −0.07, 0.015, 0.055, 0.2, 0.5, 0.0, 0.7 . . . }. The samples may be convolved as:

$$[0, -0.01] \otimes [0, 0.059] \otimes [0, -0.07] \otimes [0, 0.015] \otimes [0, 0.055] \otimes [0, 0.2] \otimes [0, 0.5] \otimes [0, 0.0] \otimes [0, 0.7]$$

Each step may be scaled by 50% to account for the fact that the probabilities of occurrence of a logic '1' and logic '0' are equal.

The PDFs corresponding to logic '1' and logic '0' signaling levels can be produced for a series of sampling instants and represented as a vertical cross-section of a statistical eye diagram. The various PDFs may be generated in picosecond and/or multi-picosecond steps across the width of the eye.

According to certain aspects described herein, the relationship between an aggressor signal and a victim signal for a channel may be explored through numerical manipulation of a designed channel. In some instances, a design may be realized on a circuit board, chip-carrier, substrate, IC device, etc. and the channel response determined by processing empirically obtained samples of a received signal. The channel may additionally or alternatively be modeled such that a designer may perform optimizations using estimates of the channel response based on the modeled channel. One or more design iterations may be explored without the need to produce a physical specimen of the designed channel. An optimized design may be used to create a physical circuit which can be used to verify the performance of a channel that has been optimized according to certain aspects disclosed herein.

Figure 5:
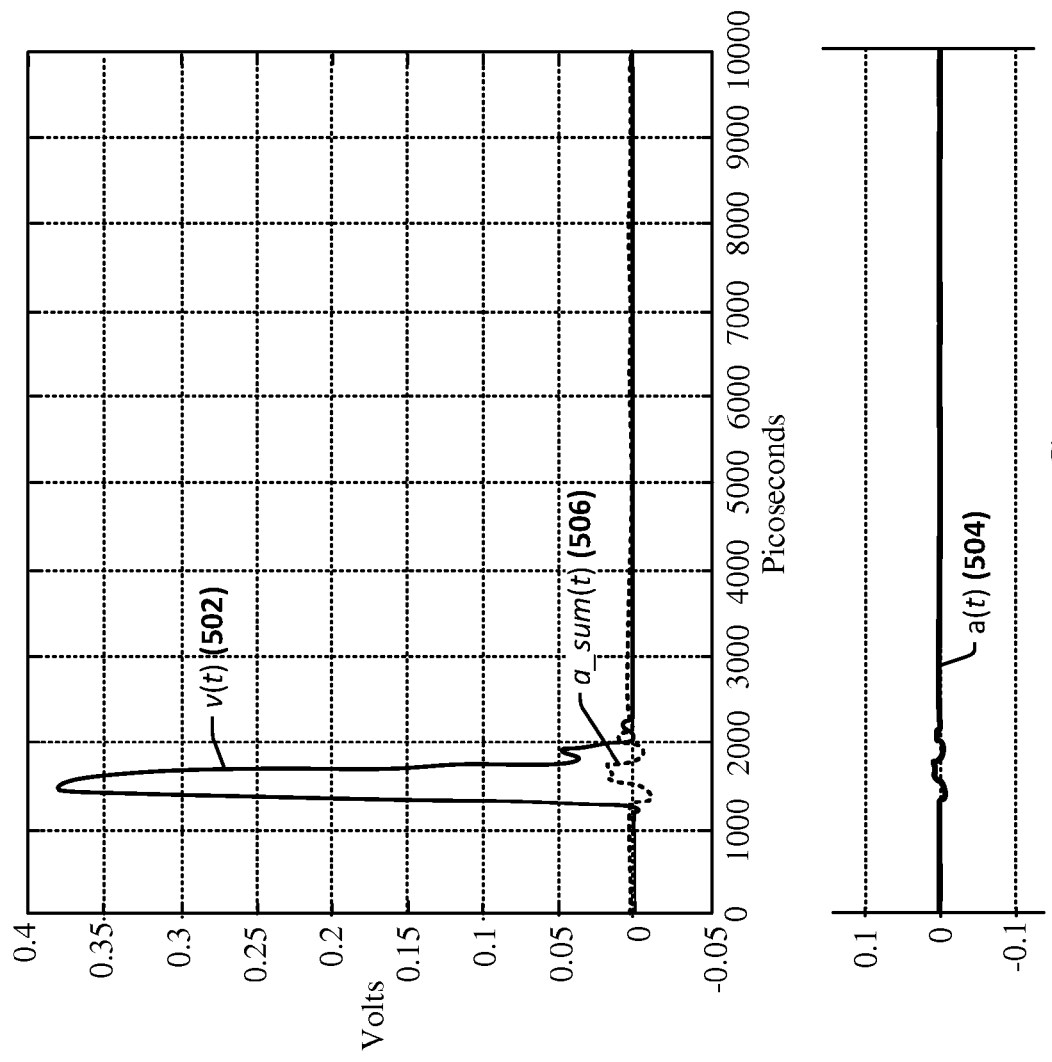
FIG. 5 illustrates channel responses to victim and aggressor signals.

FIG. 5 is a graph 500 illustrating the channel response 502 to a victim signal, one or more channel responses 504 to aggressor signals and a combined channel response 506 representing the summed channel response to the one or more aggressor signals. The combined channel response 506 is provided to aid visualization, since the independent contribution of each of the channel responses 504 to aggressor signals may be practically imperceptible when presented on a graph 500 (or the graphs 800 and 810 in FIG. 8) that includes the channel response 502 to a victim signal. Analysis may be performed by considering each aggressor response 506 independently. For example, statistical eye analyses may be generated by recursively convolving each of the aggressor responses individually, as described herein.

Figure 6:
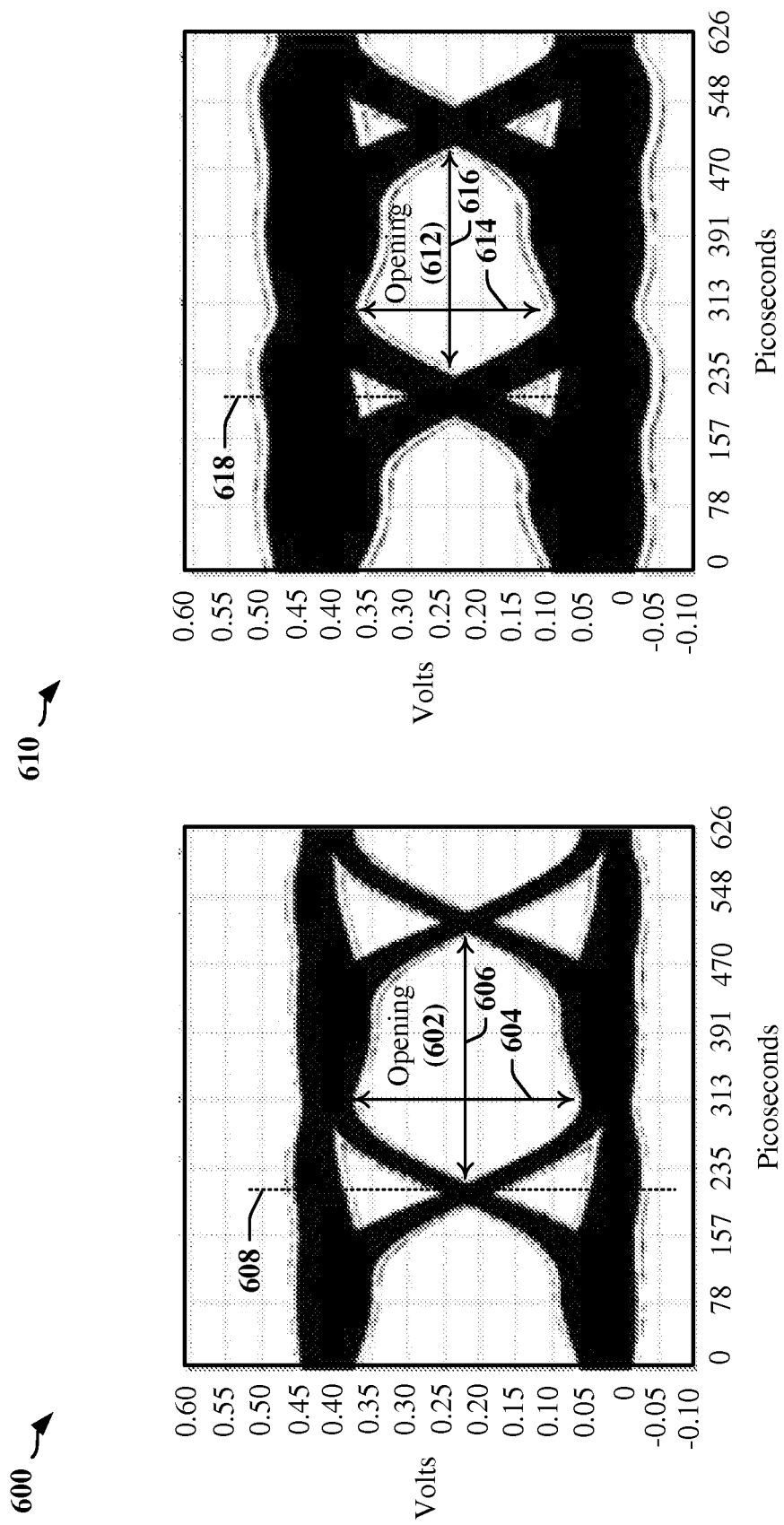
FIG. 6 is a statistical eye diagram constructed by recursively convolving victim and crosstalk samples for varying crosstalk magnitudes.

A victim pulse response 502 for the channel may be captured or calculated based on the victim signal, and crosstalk responses 504 for the channel associated with the one or more aggressor signals may be captured or calculated. A combined crosstalk response 506 of the channel may be calculated as the sum of the responses 504 for the one or more aggressor signals. A statistical eye diagram 600 (see FIG. 6) may then be constructed by recursively convolving pulse and crosstalk samples using Casper's method, for example. The opening 602 of the statistical eye diagram 600 of FIG. 6 graphically indicates to the circuit designer a voltage margin 604 and a timing margin 606 allowed by the channel. For example, the timing margin 606 may indicate the earliest and/or latest point in time that data may be available for sampling with respect to an expected transition time of a clock or strobe signal.

The effect of increased crosstalk magnitudes may be explored. The channel responses 504 to the one or more aggressor signals may be scaled individually or globally as a group to simulate changes in physical attributes of a simulated channel. For example, the sampled channel responses 504 of one or more aggressor signals may be increased by a factor calculated to simulate the effect of decreasing the proximity of the channel to neighboring channels that are the source of the one or more aggressor signals. In one example, proximity crosstalk responses are scaled through simple scalar multiplication and a new statistical eye diagram 610 may be constructed by recursively convolving victim pulse and scaled crosstalk samples. In one example, the statistical eye diagram 610 may be constructed using Casper's method. As illustrated in the statistical eye diagram 610 of FIG. 6, the opening 612 of the statistical eye diagram 610 provides lesser margins 614, 616 than the margins 604, 606 provided in the statistical eye diagram 600.

Additional statistical eye diagrams (not shown) may be produced using various scaling factors or combinations of scaling factors, and these additional statistical eye diagrams may be used together with the illustrated statistical eye diagrams 600 and 610 to determine a maximum tolerable level of crosstalk. Based on a calculated maximum tolerable crosstalk, one or more routing requirements can be configured to ensure that the crosstalk of an optimized circuit does not exceed the calculated maximum tolerable degree of crosstalk. A design optimization process according to certain aspects described herein can improve circuit design efficiency and may reduce the time required to produce a final circuit design by limiting or eliminating the number of intermediate designs that are manufactured. Conventional methods typically require the physical layout to be altered between each design iteration, and that the circuit is tested using a corresponding transient simulation.

Figure 7:
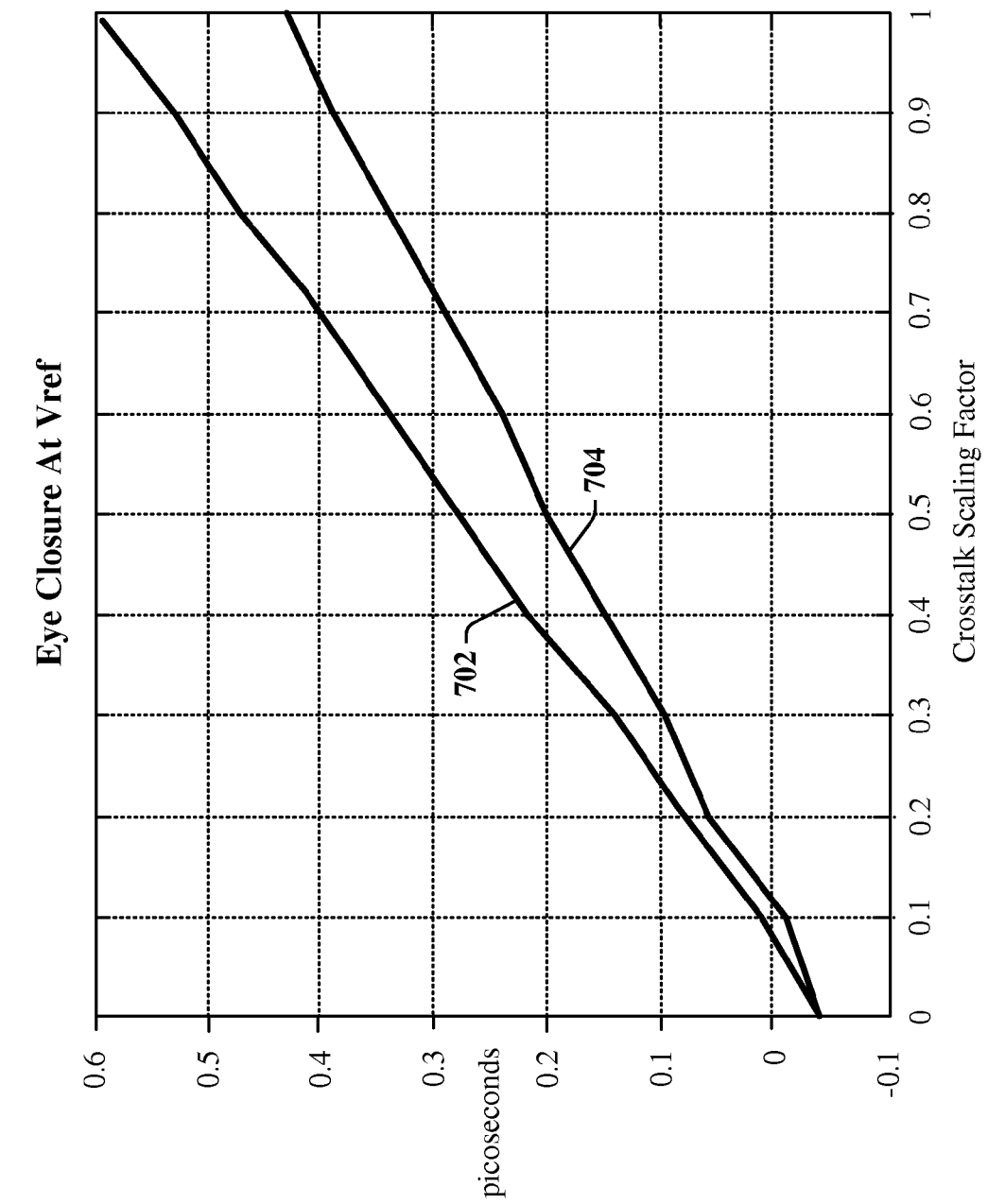
FIG. 7 illustrates the results of a crosstalk tolerance sweeps for different crosstalk magnitudes.

FIG. 7 is a graph 700 illustrating the results 702 and 704 of a crosstalk tolerance sweep for two package models. The crosstalk-induced jitter resulting from the sweep may be extracted from the models and simulations developed according to certain methods described herein and illustrated in the statistical eye diagrams 600 and 610 of FIG. 6. A crosstalk magnitude (scaling factor) can be determined based on a jitter target. A suitable crosstalk scaling factor for the circuit design may be obtained through increased trace spacing or through the addition of power shields and/or ground shields, etc. A package and/or circuit board designer can more efficiently and more rapidly develop an optimized design using certain of the disclosed methods to quickly highlight a maximum level of crosstalk that can be tolerated based on timing targets. In some instances, certain design specifications can be automatically generated based on a pulse/crosstalk ratio, which may be expressed in decibels.

According to certain aspects described herein, the phase relationship between one or more aggressor signals and a victim signal can be scaled to identify worst-case timing, and to explore the sensitivities of a particular design to phase variances introduced in crosstalk.

Figure 8:
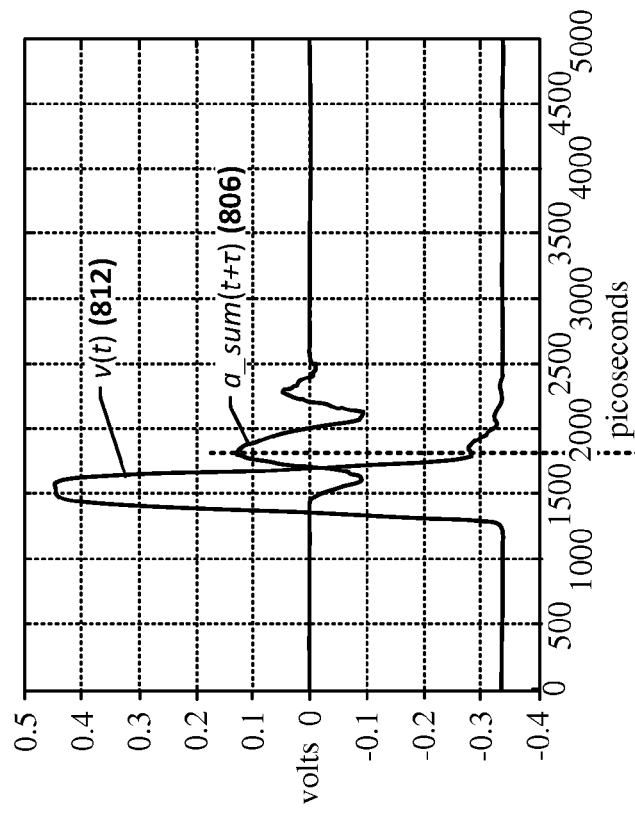
FIG. 8 illustrates channel responses for different phase relationships between victim and aggressor signals.
Figure 8:
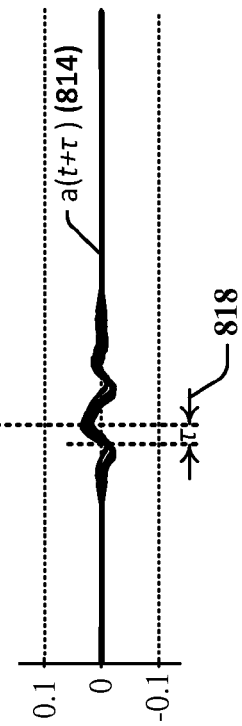
Figure 8:
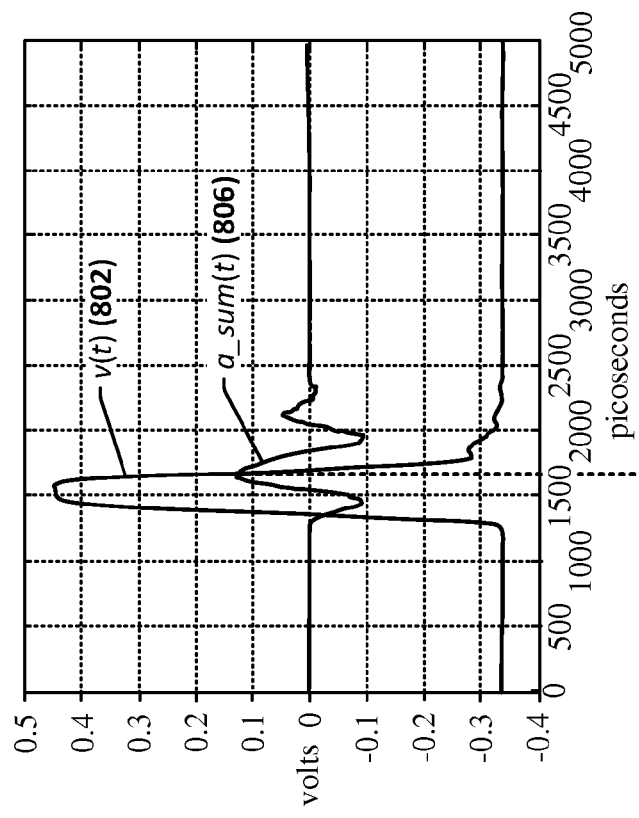
Figure 8:
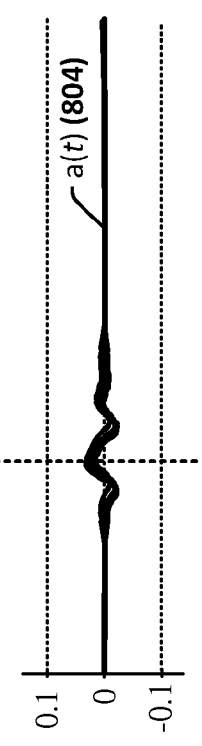

FIG. 8 includes a graph 800 illustrating the channel response 802 to a victim signal, one or more channel responses 804 aggressor signals and a combined channel response 806 (to assist visualization) representing the summed channel response to the one or more aggressor signals. A victim pulse response 802 for the channel may be captured or calculated based on the victim signal, and crosstalk responses 804 for the channel associated with the one or more aggressor signals may be captured or calculated. A combined crosstalk response 806 for the channel may be calculated as the sum of the responses 804 for the one or more aggressor signals. A statistical eye diagram 900 (see FIG. 9) may then be constructed by recursively convolving pulse and crosstalk samples, using Casper's method for example. The opening 902 of the statistical eye diagram 900 of FIG. 9 graphically indicates to the circuit designer a voltage margin 904 and a timing margin 906 allowed by the channel, relative to a signal transition edge 908. For example, the timing margin 906 indicates the earliest and latest point in time that data may be available for sampling with respect to an expected transition time of a clock or strobe signal.

The effect of increased or decreased phase differences between victim and aggressor signals may then be explored. The time scale of the aggressor channel responses 804 may be shifted a time difference 818 relative to the one or more victim signals. A new statistical eye diagram 910 (see FIG. 9) may be constructed by recursively convolving pulse and scaled crosstalk samples. The statistical eye diagram 910 may indicate a voltage margin 914 and a timing margin 916 allowed by the channel, relative to a signal transition edge 918, and may be constructed using Casper's method, for example. In one example, increased or decreased phase differences may be simulated through the use of a timing offset 818 in the convolution of the pulse and scaled crosstalk samples. As illustrated by a comparison of the statistical eye diagrams 900 and 910 in FIG. 9, variations between the opening 912 of the statistical eye diagram 910 corresponding to the time-shifted aggressor channel responses and the opening 902 of the statistical eye diagram 900 corresponding to the aggressor channel responses without a time-shift may result in greater or lesser margins 914 or 916 than the margins 904, 906.

Figure 9:
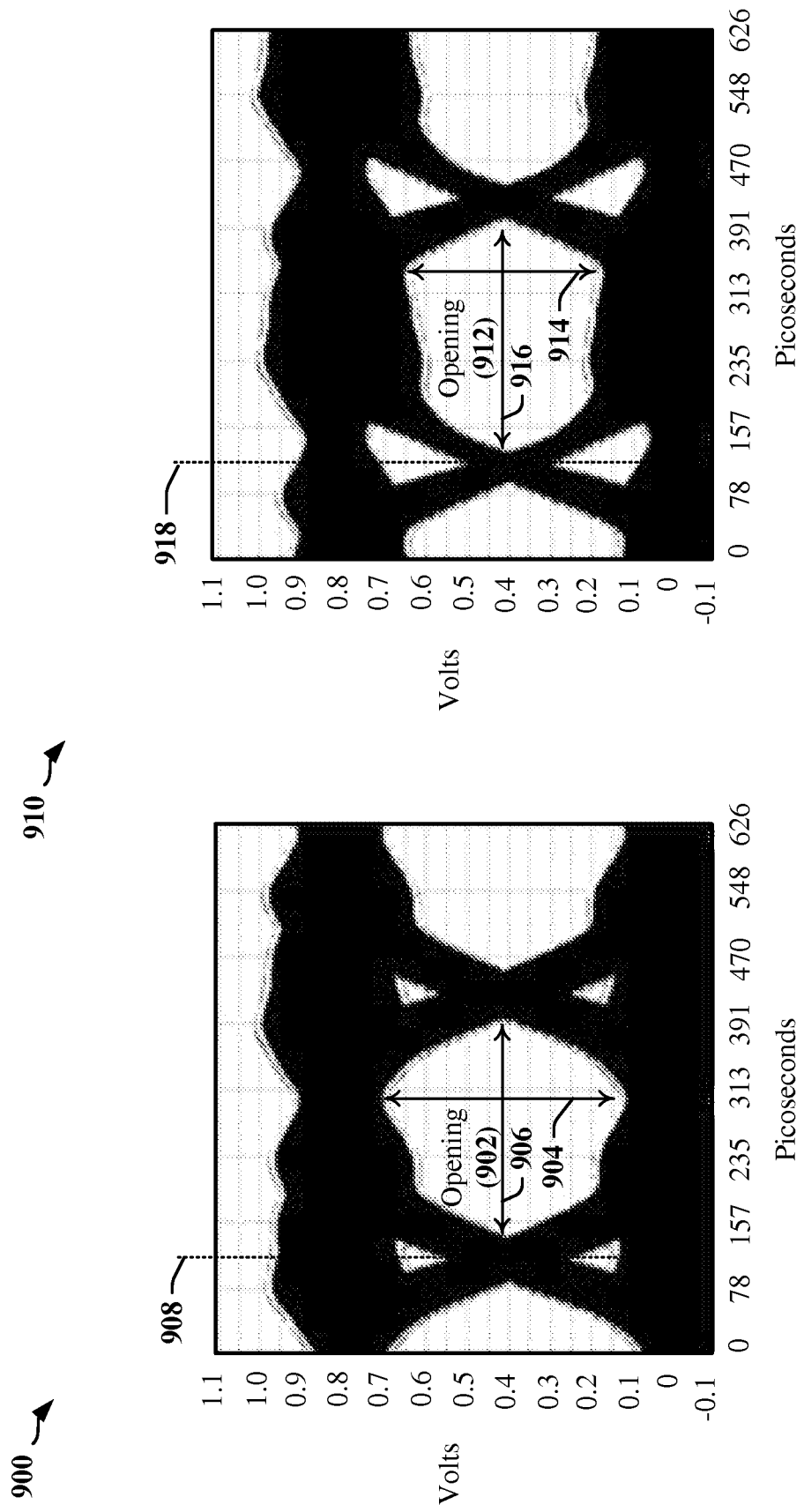
FIG. 9 is a statistical eye diagram constructed by recursively convolving victim and crosstalk samples for different phase relationships between victim and aggressor signals.

Additional statistical eye diagrams (not shown) may be produced using various timing delays to simulate worst-case and best-case phase, and these additional statistical eye diagrams and the statistical eye diagrams 900 and 910 in FIG. 9 may be used to determine a maximum tolerable phase difference between aggressor and victim signals. Based on a calculated maximum tolerable phase difference, one or more routing requirements can be configured to ensure that the crosstalk of an optimized circuit does not exceed the calculated maximum tolerable degree of crosstalk. A design optimization process according to certain aspects described herein can improve circuit design efficiency and may reduce the time required to produce a final circuit design by limiting or eliminating the number of intermediate designs that are manufactured. Conventional methods typically require the physical layout to be altered between each design iteration, and that the circuit is tested using a corresponding transient simulation.

Figure 10:
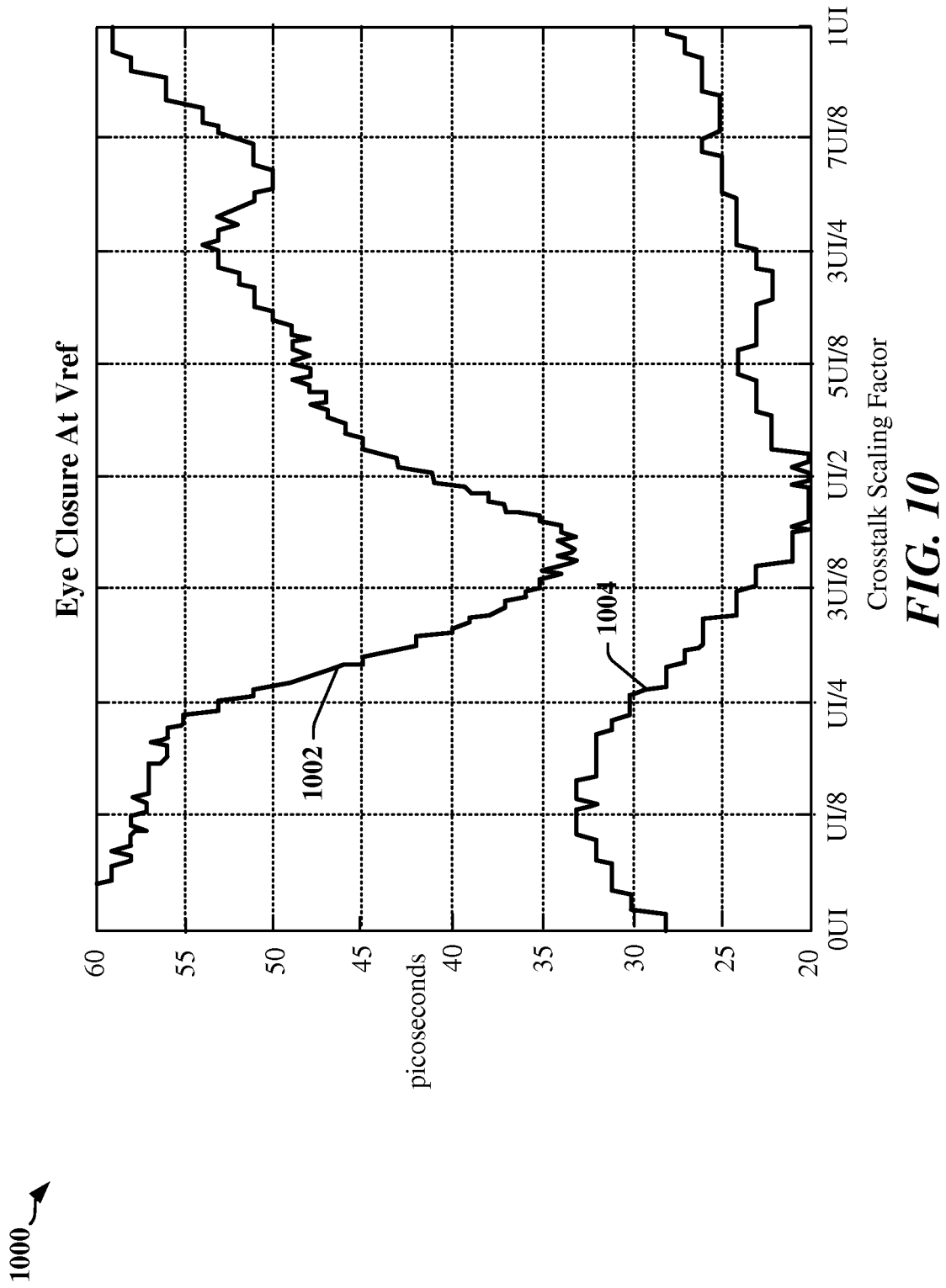
FIG. 10 illustrates the results of a crosstalk tolerance sweeps for different phase relationships between victim and aggressor signals.

FIG. 10 is a graph 1000 illustrating the results 1002 and 1004 of a crosstalk tolerance sweep for two package models. The crosstalk-induced jitter resulting from the sweep may be extracted from the models and simulations developed according to certain methods described herein and illustrated in the statistical eye diagrams 900 and 910 of FIG. 9. Then, based on a jitter target, an optimized crosstalk phase between aggressor and victim signals can be determined A package and/or circuit board designer can more efficiently and rapidly develop an optimized design using certain of the disclosed methods to quickly highlight a maximum level of phase shift that can be tolerated between connectors, including connectors within a group. Signal routing is often performed in groups of signals, with a goal of obtaining good matching within the group. Frequently, there is little or no constraint placed on group-to-group relationships. Certain methods disclosed herein may also be applicable to designs involving LPDDR4, where the data strobe (DQS) to Data (DQ) relationship can vary between 0ps to 800 ps. In some instances, certain design specifications can be automatically generated based on a pulse/crosstalk ratio that may be expressed in decibels.

Figure 11:
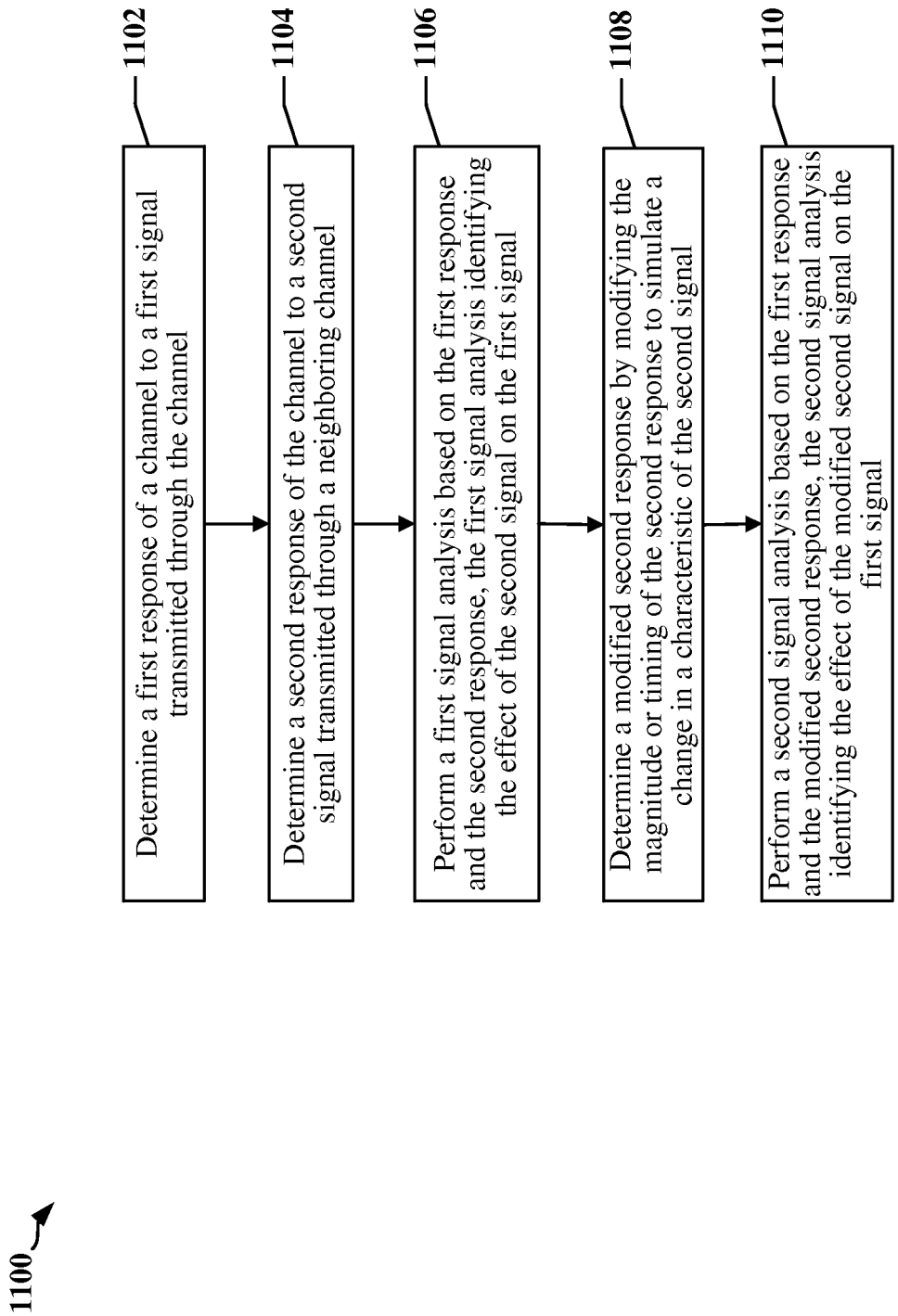
FIG. 11 is a flow chart of a method for optimizing a circuit and/or a circuit design process.

FIG. 11 is a flowchart 1100 illustrating a method of optimizing a circuit design according to certain aspects of the invention. The method may be performed using one or more of a simulator, a test equipment that can be configured to transmit test pulses over a plurality of connectors, a measuring system that samples signals received from the plurality of connectors and processing circuit.

At step 1102, a first response of a first channel to a first signal transmitted through the channel may be determined The first signal may include a pulse. The first response may be determined by sampling a version of the first signal received from the channel.

At step 1104, a second response of the first channel to a second signal transmitted through a neighboring channel may be determined The second signal may include a pulse. The channel may be electromagnetically or electrostatically coupled to the neighboring channel. The second response may be determined by sampling crosstalk in the first channel.

At step 1106, a first signal analysis may be performed based on the first response and the second response. The first signal analysis may identify the effect of the second signal on the first signal. The first signal analysis may be performed by recursively convolving the first response with the second response. The first signal analysis may be performed by sampling and recursively convolving the first response and the second response with one another. The signal analysis performed on the first or second signal may include a statistical analysis and/or a best-case/worst-case analysis.

At step 1108, a modified second response may be determined by modifying the magnitude or timing of the second response to simulate a change in a characteristic of the second signal. In one example, the characteristic may be an amplitude of crosstalk from the second signal in the first channel. In one example, the characteristic may relate to a phase relationship between the first and second signals or between the first and second responses. The modified second response may be determined by scaling samples of crosstalk in the channel.

At step 1110, a second signal analysis may be performed based on the first response and the modified second response. The second signal analysis may identify the effect of crosstalk derived from the modified second signal on the first signal. The second signal analysis may be performed by recursively convolving the first response with the second response after a delay is added to the first response or the second response. The second signal analysis may be performed by recursively convolving samples of the first signal received from the channel with scaled samples of the crosstalk in the channel.

In an aspect of the disclosure, a physical relationship between a pair of connectors of a circuit is modified based on the delay. The physical relationship between the pair of connectors of the circuit may be modified based on a magnitude of a scaling factor used to obtain the scaled samples. A distance separating a pair of connectors of a circuit may be modified based on a magnitude of a scaling factor used to obtain the scaled samples.

In an aspect of the disclosure, the modified second response may be iteratively determined and the second signal analysis performed for each iteration until the effect of the modified second signal on the first signal crosses a desired threshold. An attribute of a pair of connectors may be modified between each iteration.

Figure 12:
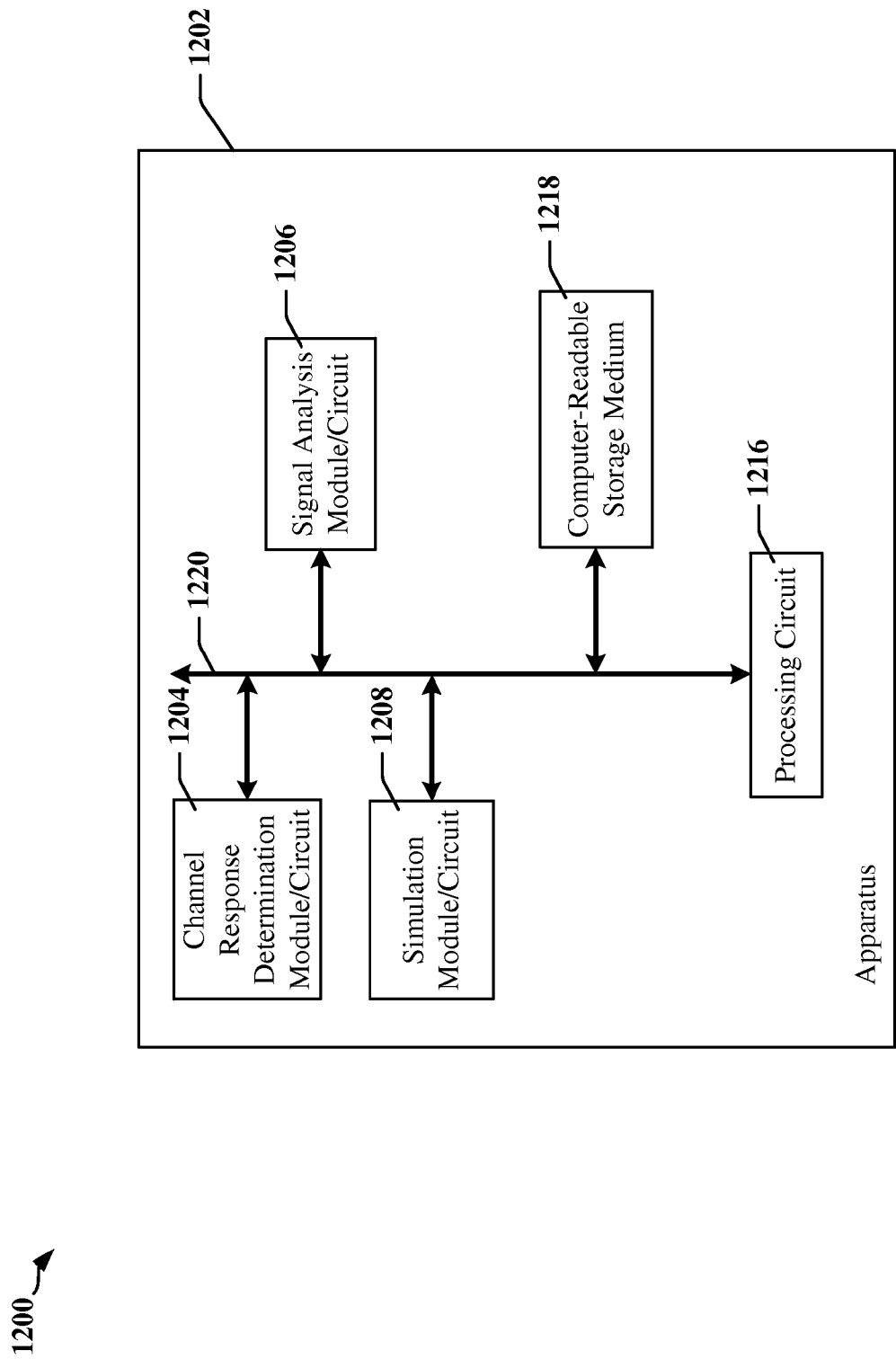
FIG. 12 is a diagram illustrating an example of a hardware implementation for an apparatus used to optimize a circuit and/or a circuit design process.

FIG. 12 is a diagram 1200 illustrating a simplified example of a hardware implementation for a device 1202 employing certain aspects of the communications methods disclosed herein. The device 1202 may be include one or more IC devices and may have a processing circuit 1216 that may include one or more of a microprocessor, microcontroller, digital signal processor, a sequencer and a state machine. The processing circuit 1216 may be implemented with a bus architecture, represented generally by the bus 1220. The bus 1220 may include any number of interconnecting buses and bridges depending on the specific application of the device 1202 and the overall design constraints. The bus 1220 links together various circuits including one or more processors and/or hardware modules, represented by the processing circuit 1216, the modules or circuits 1204, 1206 and 1208 and the bus may enable configuration and/or reconfiguration of one or more of the modules or circuits 1204, 1206 and 1208. The bus 1220 may also link various other circuits such as timing sources, peripherals, voltage regulators, and power management circuits, which are well known in the art, and therefore, will not be described any further.

The processor 1216 is responsible for general processing, including the execution of software stored on the computer-readable storage medium 1218. The software, when executed by the processor 1216, causes the processing circuit 1216 to perform or configure various functions described supra for any particular apparatus. The computer-readable storage medium 1218 may also be used for storing data that is manipulated by the processing circuit 1216 when executing software, including data decoded from signals transmitted over the connectors 1214. The device 1202 further includes at least one of the modules 1204, 1206 and 1208. The modules 1204, 1206 and 1208 may include some combination of software modules running in the processing circuit 1216, and hardware circuits or modules.

In one configuration, the device 1202 may include a module and/or circuit 1204 that is configured to determine a response of a channel to a first signal transmitted through the channel, a module and/or circuit 1206 for performing a signal and/or statistical analysis based on responses of the channel to two or more signals, and a module and/or circuit 1208 for modifying a physical relationship between a pair of connectors of a circuit based on a delay or scaling factor used in the signal analysis of two or more responses.

The aforementioned means may be implemented, for example, using some combination of elements of the receiver circuit 706 and coupling capacitor 718, which may be incorporated in the receiving circuit 706.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method, comprising:
    determining a first response of a channel to a first signal transmitted through the channel;
    determining a second response of the channel to a second signal transmitted through a neighboring channel;
    performing a first signal analysis based on the first response and the second response, wherein performing the first signal analysis includes recursively convolving samples of the first response with samples of the second response, and wherein the first signal analysis identifies an effect of the second signal on the first signal;
    determining a modified second response by numerically scaling a magnitude or timing of the second response to simulate a change in a characteristic of the second signal; and
    performing a second signal analysis based on the first response and the modified second response, the second signal analysis identifying the effect of the change in the characteristic of the second signal on the first signal.

2. The method of claim 1, wherein the first signal comprises a first pulse and the second signal comprises a second pulse.

3. The method of claim 2, wherein at least one of the first pulse and the second pulse is formed by combining a positive-transitioning step with a negative-transitioning step.

4. The method of claim 1, wherein determining a second response of the channel includes determining responses of the channel for a plurality of second signals transmitted through neighboring channels.

5. The method of claim 1, wherein the first response is determined by sampling a version of the first signal received from the channel and the second response is determined by sampling crosstalk in the channel, wherein the channel is electromagnetically or electrostatically coupled to the neighboring channel.

6. The method of claim 1, wherein the characteristic of the second signal comprises an amplitude of crosstalk introduced into the channel from the second signal.

7. The method of claim 5, wherein performing the second signal analysis includes recursively convolving samples of the first response with samples of the second response after a delay is added to the first response or the second response.

8. The method of claim 7, further comprising:
modifying a physical relationship between a pair of connectors of a circuit based on the delay.

9. The method of claim 1, wherein determining the modified second response includes scaling samples of crosstalk in the channel, and wherein performing the second signal analysis includes recursively convolving samples of the first signal received from the channel with scaled samples of the crosstalk in the channel.

10. The method of claim 9, further comprising:
modifying a physical relationship between a pair of connectors of a circuit based on a magnitude of a scaling factor used to obtain the scaled samples.

11. The method of claim 9, further comprising:
modifying a distance separating a pair of connectors of a circuit based on a magnitude of a scaling factor used to obtain the scaled samples.

12. A method, comprising:
determining a first response of a channel to a first signal transmitted through the channel;
determining a second response of the channel to a second signal transmitted through a neighboring channel;
performing a first signal analysis based on the first response and the second response, the first signal analysis identifying an effect of the second signal on the first signal;
determining a modified second response by modifying a magnitude or timing of the second response to simulate a change in a characteristic of the second signal;
performing a second signal analysis based on the first response and the modified second response, the second signal analysis identifying the effect of the change in the characteristic of the second signal on the first signal; and
iteratively repeating the steps of determining the modified second response and performing the second signal analysis until the effect of the change in the characteristic of the second signal on the first signal crosses a desired threshold, wherein an attribute of a pair of connectors is modified between each iteration.

13. An apparatus, comprising:
means for determining a first response of a channel to a first signal transmitted through the channel;
means for determining a second response of the channel to a second signal transmitted through a neighboring channel;
means for performing a first signal analysis based on the first response and the second response, wherein the means for performing the first signal analysis is configured to recursively convolve samples of the first response with samples of the second response, and wherein the first signal analysis identifies an effect of the second signal on the first signal;
means for determining a modified second response by numerically scaling a magnitude or timing of the second response to simulate a change in a characteristic of the second signal; and
means for performing a second signal analysis based on the first response and the modified second response, the second signal analysis identifying the effect of the change in the characteristic of the second signal on the first signal.

14. The apparatus of claim 13, wherein the first signal comprises a first pulse and the second signal comprises a second pulse.

15. The apparatus of claim 14, wherein at least one of the first pulse and the second pulse is a combination of a positive-transitioning step and a negative-transitioning step.

16. The apparatus of claim 13, wherein the second response of the channel comprises responses of the channel determined for a plurality of second signals transmitted through neighboring channels.

17. The apparatus of claim 13, wherein the first response is determined by sampling a version of the first signal received from the channel and the second response is determined by sampling crosstalk in the channel, wherein the channel is electromagnetically or electrostatically coupled to the neighboring channel.

18. The apparatus of claim 17, wherein the characteristic of the second signal comprises an amplitude of crosstalk introduced into the channel from the second signal.

19. The apparatus of claim 17, wherein the means for performing the second signal analysis is configured to recursively convolve samples of the first response with samples of a version of the second response after a delay is added to the first response or the second response.

20. The apparatus of claim 19, further comprising:
means for modifying a physical relationship between a pair of connectors of a circuit based on the delay.

21. The apparatus of claim 13, wherein the means for determining the modified second response is configured to scale samples of crosstalk in the channel, and wherein the means for performing the second signal analysis is configured to recursively convolve samples of a version of the first signal received from the channel with scaled samples of the crosstalk in the channel.

22. The apparatus of claim 21, further comprising:
means for modifying a physical relationship between a pair of connectors of a circuit based on a magnitude of a scaling factor used to obtain the scaled samples.

23. An apparatus for wireless communication, comprising:
a processing system configured to:
determine a first response of a channel to a first signal transmitted through the channel;
determine a second response of the channel to a second signal transmitted through a neighboring channel;
perform a first signal analysis based on the first response and the second response, wherein the first signal analysis is performed by recursively convolving samples of the first response with samples of the second response, and wherein the first signal analysis identifies an effect of the second signal on the first signal;
determine a modified second response by numerically scaling a magnitude or timing of the second response to simulate a change in a characteristic of the second signal; and
perform a second signal analysis based on the first response and the modified second response, the second signal analysis identifying the effect of the change in the characteristic of the second signal on the first signal.

24. The apparatus of claim 23, wherein at least one of the first signal and the second signal is formed by combining a positive-transitioning step with a negative-transitioning step.

25. The apparatus of claim 23, wherein the first response is determined by sampling a version of the first signal received from the channel and the second response is determined by sampling crosstalk in the channel, wherein the crosstalk is derived from one or more signals transmitted in neighboring channels.

26. The apparatus of claim 25, wherein the processing system is configured to:
perform the second signal analysis by recursively convolving samples of the first response with samples of the second response after a delay is added to the first response or the second response,
wherein a physical relationship between a pair of connectors of a circuit based is modified based on the delay.

27. The apparatus of claim 23, wherein the processing system is configured to:
determine the modified second response by scaling samples of crosstalk in the channel; and
perform the second signal analysis by recursively convolving samples of a version of the first signal received from the channel with scaled samples of the crosstalk in the channel,
wherein a physical relationship between a pair of connectors of a circuit is modified based on a magnitude of a scaling factor used to obtain the scaled samples.

28. The apparatus of claim 27, wherein the physical relationship between the pair of connectors includes a distance separating the pair of connectors.

29. The apparatus of claim 23, wherein the processing system is configured to:
repetitively determine the modified second response and calculate the second signal analysis until the effect of the change in the characteristic of the second signal on the first signal crosses a desired threshold,
wherein an attribute of a pair of connectors is modified between each repetition.

30. A non-transitory processor-readable storage medium having one or more instructions which, when executed by at least one processing circuit, cause the at least one processing circuit to:
determine a first response of a channel to a first signal transmitted through the channel;
determine a second response of the channel to a second signal transmitted through a neighboring channel;
perform a first signal analysis based on the first response and the second response, wherein the first signal analysis is performed by recursively convolving samples of the first response with samples of the second response, and wherein the first signal analysis identifies an effect of the second signal on the first signal;
determine a modified second response by numerically scaling a magnitude or timing of the second response to simulate a change in a characteristic of the second signal; and
perform a second signal analysis based on the first response and the modified second response, the second signal analysis identifying the effect of the change in the characteristic of the second signal on the first signal.

31. The storage medium of claim 30, wherein at least one of the first signal and the second signal is formed by combining a positive-transitioning step with a negative-transitioning step.

32. The storage medium of claim 30, wherein the one or more instructions cause the at least one processing circuit to:
determine the second response of the channel by determining responses of the channel for a plurality of second signals transmitted through neighboring channels.

33. The storage medium of claim 30, wherein the first response is determined by sampling a version of the first signal received from the channel and the second response is determined by sampling crosstalk in the channel, wherein the channel is electromagnetically or electrostatically coupled to the neighboring channel.

34. The storage medium of claim 33, wherein the characteristic of the second signal comprises an amplitude of crosstalk introduced into the channel from the second signal.

35. The storage medium of claim 33, wherein the one or more instructions cause the at least one processing circuit to:
recursively convolve samples of the first response with samples of a version of the second response after a delay is added to the first response or the second response, when performing the second signal analysis.

36. The storage medium of claim 35, wherein the one or more instructions cause the at least one processing circuit to:
cause a physical relationship between a pair of connectors of a circuit to be modified based on the delay.

37. The storage medium of claim 30, wherein the one or more instructions cause the at least one processing circuit to:
scale samples of crosstalk in the channel before determining the modified second response; and
recursively convolve samples of a version of the first signal received from the channel with scaled samples of the crosstalk in the channel to obtain the second signal analysis.

38. The storage medium of claim 37, wherein the one or more instructions cause the at least one processing circuit to:
modify a physical relationship between a pair of connectors of a circuit based on a magnitude of a scaling factor used to obtain the scaled samples.

39. The storage medium of claim 37, wherein the one or more instructions cause the at least one processing circuit to:
modify a distance separating a pair of connectors of a circuit based on a magnitude of a scaling factor used to obtain the scaled samples.

40. The storage medium of claim 30, wherein the one or more instructions cause the at least one processing circuit to repetitively:
determine the modified second response; and
generate the second signal analysis until the effect of the change in the characteristic of the second signal on the first signal crosses a desired threshold,
wherein an attribute of a pair of connectors is modified between each repetition.

* * * * *